United States Patent Office 3,306,714
Patented Feb. 28, 1967

3,306,714
TREATMENT OF AQUEOUS MEDIA TO REMOVE SOLUBILIZED HUMATES IN THE PRESENCE OR ABSENCE OF SOLUBILIZED SILICA
Mayer B. Goren, Golden, Colo., assignor to Kerr-McGee Oil Industries, Inc., a corporation of Delaware
No Drawing. Filed Feb. 20, 1964, Ser. No. 346,090
20 Claims. (Cl. 23—321)

This invention broadly relates to the treatment of aqueous media containing solubilized humates. In some of its more specific aspects, the invention also relates to a novel process for treating acidic aqueous media containing solubilized humates and/or solubilized silica to reduce the solubilized humate and/or silica content, and to the recovery of desired metal values from the treated aqueous media.

The invention may be illustrated and described hereinafter with specific reference to the treatment of lignite leach liquors containing dissolved uranium and molybdenum values and solubilized humates and/or solubilized silica. However, it is understood that the invention is useful in the treatment of aqueous media in general containing solubilized humates and/or silica.

Extensive lignite deposits are found in the Dakotas which contain substantial concentrations of uranium and often significant amounts of molybdenum. The uranium and molybdenum are held in the lignite in a manner somewhat similar to ion exchange attachment to humic acid, as well as in more well defined uranium and molybdenum minerals.

In accordance with prior art practice, it has been found that the lignite may be leached in the raw state with aqueous sulfuric acid in the presence or absence of added oxidizing agents. The uranium and molybdenum values are satisfactorily dissolved from the lignite by the aqueous sulfuric acid solution although the leaching conditions may be somewhat more drastic than those required for leaching other types of uranium ores as apparently the carbon complexes of the uranium are more difficult to solubilize. The big problem heretofore in leaching raw lignite with aqueous sulfuric acid has been liquid-solid separation. During the leaching, substantial quantities of contaminating materials such as organic humates, silica, clay dispersions, etc. are dispersed, peptized or solubilized in the leach solution and interfere markedly with subsequent liquid-solid separations.

The leaching of raw lignite with aqueous sodium carbonate is also very successful in solubilizing the uranium and molybdenum values but liquid-solid separation is impossible on a practical scale. Only small quantities of liquor are obtainable from aqueous carbonate leaches even by exhaustive centrifuging due to the behavior in the aqueous alkaline medium of the suspended clays, solubilized organic humates and peptized organics. Accordingly, aqueous carbonate leaching of raw uranium-containing lignite is impractical.

While sulfuric acid leaching of uranium-containing lignite is more satisfactory than sodium carbonate leaching, the processing of uranium and molybdenum containing raw lignite leach liquor from a sulfuric acid leach is extremely difficult in accordance with prior art practice. The sulfuric acid leach liquor cannot be processed by ion exchange to recover the uranium values due to molybdenum poisoning of the ion exchange resin. Also, the prior art solvent extraction processes for recovering the uranium and/or molybdenum values with either amine or phosphate ester extractants is impractical, if not impossible, due to sludge formation and emulsion difficulties caused by the solubilized humates and silica.

The lignite leach liquor may be contacted with activated charcoal which removes by absorption the bulk of the black organic coloring matter which accompanies the uranium and molybdenum into solution. While the charcoal removes most of the interfering humates, it is ineffective in removing the solubilized silica. Processing of charcoal treated lignite leach liquors by solvent extraction with a mono-, di- or trialkyl amine or a mono- or dialkyl phosphate is possible but not practical as the solubilized silica produces an emulsion problem. Also, more important from the economic viewpoint is the fact that the leach liquor contains tremendous quantities of ferric ion which must be reduced before a solvent extraction step with phosphate ester extractants.

In view of the foregoing, there has been no entirely satisfactory economic process available heretofore for processing hydrometallurgical leach liquors which contain a high solubilized humate and/or silica content. This is especially true with respect to lignite leach liquors which contain uranium and molybdenum values in addition to solubilized humates and silica as contaminates as it is desirable to recover both the uranium and molybdenum values.

It is an object of the present invention to provide a novel process for treating aqueous media containing solubilized humates and/or solubilized silica.

It is a further object to provide a novel process for rendering innocuous solubilized humates and/or solubilized silica present in aqueous media to be further processed for the recovery of desired metal values.

It is still a further object to provide a novel process for solvent extracting desired metal values present in aqueous media containing solubilized humates and/or solubilized silica which normally interfere with the solvent extraction step.

It is still a further object to provide a novel process for recovering dissolved uranium and/or molybdenum values from lignite leach liquors which contain interfering solubilized humates as contaminating impurities.

Still other objects and advantages of the invention will be apparent to those skilled in the art upon reference to the following detailed description and the examples.

In accordance with one important aspect of the present invention, a process is provided for treating an aqueous medium containing solubilized humates capable of emulsion stabilization to thereby render at least a portion of the humates innocuous in subsequent processing of the aqueous medium. This may be accomplished by dispersing in the aqueous medium at least one substance selected from the group consisting of water soluble organic compounds containing a plurality of oxyalkylene groups, water dispersible collagen derived colloidal proteinaceous substances, water dispersible poly (N-vinyl pyrrolidone), and mixtures thereof. The aqueous medium also may contain molecularly dissolved or colloidally dispersed polysilicic acid, herein termed solubilized silica, which is likewise rendered innocuous by the process of the invention.

A variety of water soluble organic compounds containing a plurality of oxyalkylene groups may be dispersed in the aqueous medium. For instance, water soluble organic compounds containing a poly (alkylene oxide) structure, i.e., a plurality of oxyalkylene groups, and preferably a poly (ethylene oxide) structure, i.e., a plurality of oxyethylene groups, will precipitate or aid in precipitating selectively the solubilized humates and/or solubilized silica of the types that result in emulsion stabilization or sludge formation when the aqueous medium is solvent extracted to recover dissolved metal values therefrom. High molecular weight water soluble polyalkylene glycols and especially polyethylene glycols having a molecular weight from about 4,000 to several million are very useful in binding and precipitating the solubilized humates and colloidal and subcolloidal silica, or polysilicic acid, from aqueous media. Lower molecular weight water soluble polyethoxylated phenols and polyethoxylated long chain amides, amines and esters also are of utility and serve as convenient and readily accessible reagents with which to test for the presence of solubilized humates and silica which promote the processing difficulties mentioned herein.

An acidic leach liquor which contains dissolved partly condensed silica and/or humates will give a precipitate ranging in nature from feathery to an agglomerated rubbery material depending upon the molecular weight of the precipitate when treating with the foregoing reagents. If leach liquor is treated with sufficient reagent and preferably a very high molecular weight poly (ethylene oxide) such as Polyox marketed by Union Carbide Corporation, the resulting treated leach liquor from which the organic complex of solubilized humates and/or silica has been separated will no longer give a precipitate on further addition of these reagents and will behave normally in solvent extraction processes with substantially no interference from humates and/or silica. Analysis shows that the so treated leach liquor still contains some humates and/or some silica, but it is believed that the residual humates and/or silica remaining in solution and which are not precipitated by the above reagents do not cause emulsion difficulties in solvent extraction processes as they are too low in molecular weight.

For convenience, Triton X-100, a proprietary product of Rohm and Haas Company which is said to be a water soluble isooctyl phenoxy polyethoxy ethanol having a viscosity of about 240 centipoises at 25° C., has been employed for the qualitative detection of solubilized humates and/or solubilized silica which interfere with solvent extraction and which are capable of emulsion stabilization or sludge formation during solvent extraction, by a test procedure wherein one or two drops of the commercial material is added to several milliliters of the acidic solution to be tested. Other materials of related chemical structure may be used such as the "Carbowax" products (high molecular weight polyethylene glycols such as "Carbowax 20M" having a molecular weight of 15,000–20,000) and the "Ucon" lubricants (water soluble polyalkylene glycols and derivatives) marketed by Union Carbide Corporation. The water dispersible "Etho" series of compounds, such as "Ethomids" (N,N-substituted fatty acid amides, the substituents being polyoxyethylene groups), "Ethomeens" (tertiary amines having one fatty alkyl group of 12–18 carbon atoms and two polyoxyethylene groups attached to the nitrogen), etc. marketed by Armour and Company, all of which have polyoxyethylene structures, serve equally well in this qualitative test. The foregoing materials all form feathery flocculant precipitates which are indicative of the presence of soluble silica and/or solubilized humates. Egg albumen also may be used for this purpose, if desired.

The organic compounds containing a plurality of oxyalkylene groups are preferably ethylene oxide polymers and have a molecular weight of at least 4,000 for best results, but the molecular weight may be as high as from 500,000 to 3, 4 or 5 million. Treatment of an acidic aqueous medium containing solubilized humates and/or silica with a dilute solution of an organic compound containing a plurality of oxyalkylene groups results in the formation of a precipitate immediately in instances where the molecular weight is sufficiently high, or in the formation of a cloudy solution from which a precipitate may be obtained upon standing when a low molecular weight compound is used. In instances where low molecular weight organic oxyalkylene compounds are employed, it is often preferred to thereafter contact the cloudy solution with freshly prepared silica gel to rapidly precipitate the humates and silica.

The organic compounds containing a plurality of oxyalkylene groups may contain the divalent structure or grouping $(-O-R-)_n$ where R is an alkylene radical containing, for example 2 through 8 and preferably 2 through 4 carbon atoms and $n$ is an integer of at least 2. The terminal valences for the divalent structure

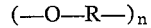

$$(-O-R-)_n$$

may vary widely and are not of importance provided the resulting compound is water soluble or water dispersible. For instance, the terminal valences may be satisfied by monovalent groups such as H, OH, alkyl, aryl, aralkyl, cycloalkyl, etc. The organic compounds containing the oxyalkylene groups may be molecularly or colloidally soluble in the aqueous medium to be treated.

The useful water dispersible collagen derived colloidal proteinaceous substances include a wide variety of substances. For instance, this terminology is intended to include collagen derived organic nitrogenous colloidal substances of the protein class, such as glue, gelatin, water soluble extractives from collagen-like materials, etc. The substances may be used as they naturally occur or are obtained in usual commercial practice, or they may be crosslinked with aldehydes or other reagents such as is disclosed in United States Patent 2,937,143, the teachings of which are incorporated herein by reference. Thus, both natural and artificially crosslinked materials are encompassed by the terminology used herein. In instances where crosslinked materials are employed, it is understood that they are water swellable and dispersible and thus may be readily dispersed in the aqueous medium to be treated. Of the water dispersible collagen derived colloidal proteinaceous substances, glue, which includes crosslinked glue, is usually preferred for economic reasons. However, it is understood that other related materials may be employed and especially those which are commercially available at competitive prices.

The water dispersible poly (N-vinyl pyrrolidone) to be used as a treating agent may be substantially linear or crosslinked such as is disclosed in my copending application Serial No. 209,290, filed July 12, 1962, for "Flocculating and Agglomerating Process for Solids Suspended in Aqueous Medium," the teachings of which are incorporated therein by reference. Thus, the terminology water dispersible poly (N-vinyl pyrrolidone) as used herein is intended to include both linear and crosslinked materials. Often, it is desirable to employ a dilute aqueous suspension of the polymer for treatment of the aqueous medium, such as a 0.5% by weight dispersion, rather than add the solid polymer directly to the aqueous medium to be treated.

Mixtures of the aforementioned water soluble organic compounds containing a plurality of oxyalkylene groups, water dispersible collagen derived colloidal proteinaceous substances, and water dispersible poly (N-vinyl pyrrolidone) may be employed when desired. It is especially useful in many instances to first treat the aqueous medium with a water dispersible collagen derived colloidal proteinaceous substance and thereafter with an organic compound containing a plurality of oxyalkylene groups. In instances where both solubilized humates and solubilized silica are present in the aqueous medium, then the results are especially good. Often, it is preferred that relatively inexpensive glue be first dispersed in the aqueous medium to be treated to form a heavy precipitate of the contaminating humates and/or silica, and then the aqueous medium may be treated thereafter with an organic compound containing a plurality of oxyethylene groups.

The aqueous medium containing solubilized humates and/or silica to be treated in accordance with the present invention may be acidic, and for better results the pH value should be below 4.5. Optimum results are usually obtained when the aqueous medium has a pH value of about 1–2.5.

The substance dispersed in the aqueous medium to be treated may be added in a quantity which results in a desired reduction in the solubilized humates and/or silica content. This will necessarily vary with the amount of humates and/or silica initially solubilized in the aqueous medium. For best results, it is usually preferred that the substance be dispersed in the aqueous medium in a quantity sufficient to result in substantially complete precipitation of the precipitable solubilized humates and/or silica of the types which interfere with solvent extraction or which are capable of emulsion stabilization. Some low molecular weight humates and/or silica may be allowed to remain in solution as they do not have an adverse effect on solvent extraction. Usually when treating most leach liquors, the substance may be dispersed therein an amount of about 0.1–10 pounds for each short ton of the leach liquor. However, it is understood that smaller or larger quantities may be added as necessary in order to decontaminate the leach liquor to a desired level. It is also understood that one or more precipitants may be added to the aqueous media, and that the aqueous media may be treated with other substances or by other means in order to assure more complete and rapid precipitation of the humates and silica.

The materials to be dispersed in the aqueous media may have a wide range of molecular weights. For instance, water soluble or dispersible substances having molecular weights of 4,000 may be used in practicing the present invention, and water soluble or dispersible substances having much higher molecular weights such as 500,000 to 1, 2, 3 or 4 million may be employed. In instances where a lower molecular weight material is employed, then the solubilized humates and/or silica are not precipitated as rapidly as when higher molecular weight materials are employed. Nevertheless, the humate and/or silica content of the aqueous medium is reduced. Also, it is possible to employ auxiliary treatments which will result in rapid precipitation regardless of the molecular weight of the treating agent which is dispersed in the aqueous medium.

In accordance with one preferred variant of the invention, the aqueous medium is first treated with one of the substances mentioned above such as a polyoxyalkylated compond, and then the aqueous medium containing the treating agent dispersed therein is contacted with the silica gel to thereby rapidly precipitate the contaminating humates and/or silica. The silica gel is preferably freshly prepared and is intimately intermixed and contacted with the aqueous medium in the presence of the dispersed substance.

It has also been discovered that sparging the aqueous medium with air or other elemental oxygen containing gas aids in removing the solubilized humates. Thus, in another preferred variant of the invention, the aqueous medium containing the treating agent dispersed therein is aerated to thereby enhance the effect of the dispersed treating agent. If desired, this may be accomplished by bubbling air into the aqueous medium in a manner so as to vigorously agitate the aqueous medium.

The temperature at which the treating agent is dispersed in the aqueous medium is not of importance. For instance, room temperature or elevated temperatures are useful and may be employed.

The process of the invention is especially useful in removing solubilized sulfonated or sulfated humates of the types which give pronounced emulsion difficulties in solvent extraction processes. At the same time, other types of humates may be removed and thus it is not always necessary that the humates be in the sulfated or sulfonated condition.

The present invention is especially useful in treating lignite leach liquors prepared by aqueous sulfuric acid leaching of lignite ores containing uranium and/or molybdenum values. The resulting leach liquor contains dissolved uranium and/or molybdenum values, and sulfonated or sulfated humates and solubilized silica as contaminating impurities. The concentration of the contaminating solubilized humates and/or silica is so high that it is impossible to process the raw leach liquors in accordance with the prior art and recover the molybdenum and uranium values economically as separate commercial products. However, in accordance with the present invention lignite leach liquors may be readily decontaminated and rendered processable by solvent extraction with amine or phosphate ester type solvent extractants for uranium and/or molybdenum without emulsion or sludge problems.

In instances where the treated aqueous medium is to proceed to solvent extraction or other process for the recovery of dissolved metal values contained therein, it is preferred that the precipitated humates and/or silica be removed first by filtration. One preferred procedure includes treatment of the aqueous medium with glue to precipitate silica and humates, aeration, filtering to remove the precipitated humates and silica, and thereafter treatment with an organic polyethoxy compound such as polyethoxylated phenol. The resulting treated aqueous medium may be readily and easily processed by solvent extraction techniques without emulsion or sludge problems characteristic of the untreated raw liquor.

It is especially advantageous to solvent extract the lignite leach liquors treated in accordance with the present invention with mono-, di- and trialkyl amine solvent extractants for uranium and molybdenum to thereby recover both metal values simultaneously, and then strip the loaded extractant with aqueous sodium carbonate to produce a strip solution which likewise contains uranium and molybdenum values. Uranium and molybdenum-containing products of commerce may be produced from the strip solution. Since it is impossible to completely chemically precipitate the uranium values in the presence of the humates, the most convenient method of recovering uranium and molybdenum products is to evaporate the stripping solution to dryness, and then calcine the residue in an oxidizing atmosphere at a temperature of 400–1000° C., for example. This decomposes the humates and oxidizes them to carbon dioxide. The calcine is leached with water to remove the water soluble constituents and the resulting residue is a substantially pure yellow cake which meets all specifications and no further purification is required. Preferably, a small amount of sodium or potassium hydroxide is present in the water used to leach the calcine. Since the molybdenum content of the calcine is completely soluble in the water, molybdenum values are separated from the uranium values and may be recovered from the leach solution following prior art practices.

The foregoing detailed description and the following specific example are for purposes of illustration only and are not intended as being limiting to the spirit or scope of the appended claims.

*Example*

This example illustrates the treatment before solvent extraction of a raw leach liquor prepared by percolation leaching of mined lignite ore containing uranium and molybdenum values with aqueous sulfuric acid. The resulting leach liquor after final filtering contained dissolved uranium and molybdenum values, and solubilized humates and silica as contaminating impurities. A variety of conditions were employed in conditioning the leach liquor after filtration and prior to solvent extraction, as noted hereinafter.

The following reagents were employed in this example:

(a) The organic solvent extractant was 750 grams of Alamine 336, which is a tri-n-alkyl amine, and 900 grams of isodecanol, dissolved in 30 liters of kerosene.
(b) The glue solution contained 10% by weight of hide glue in water. The solution was diluted with water before use in the example.
(c) Triton X–100, which is polyoxyethlated phenol; or Armour Ethomeen T/25, which is a polyoxyethlated long chain amine.
(c) Triton X–100, which is polyoxyethylated phenol; or Armour Ethomeen T/25, which is a polyoxyethylated long chain amine.
(d) The sodium tallate solution contained 2% by weight of tall oil acids dissolved in dilute aqueous soda ash.
(e) The aqueous scrub acid contained 2 ml. of 98% $H_2SO_4$ per liter of water.
(f) The aqueous stripping solution contained 10–15% by weight of soda ash in water.

The solvent extraction board consisted of five stages of extractors in series for solvent extraction, one stage for solvent scrubbing, and one stage for stripping. Each stage included a mixer and a settler. The mixers were nominal three inch by six inch Lucite cylinders having inside diameters of 2.75 inches and containing mechanical agitators, and the settlers were three inch by eighteen inch Lucite cylinders having inside diameters of 2.75 inches. Thus, the individual mixer and settler volumes were 583 cc. and 1750 cc., respectively.

The conditioned lignite leach liquor was fed through a rotometer from a steady head tank to the No. 1 extractor stage at the beginning of the series and stripped solvent extractant was metered to the No. 5 extractor stage at the end of the series, whereby the two streams advanced in opposite directions as they passed through the series of five extractor stages. Interface and liquid levels in the settlers were maintained by jacklegs which advanced the underflow liquids. Underflow from the No. 5 extractor stage settler was barren raffinate and was discarded, while the overflow from the No. 1 extractor stage settler was organic solvent extractant loaded with uranium and molybdenum values.

The loaded organic solvent extractant was advanced to the solvent scrub system where it was scrubbed with aqueous scrub acid and then passed to a stripper where it was contacted with 15% by weight aqueous soda ash solution. The resulting stripped organic solvent extractant was returned to solvent storage and recycled to the extractor stages, while the aqueous strip liquor containing dissolved uranium and molybdenum values and some humates as a contaminating impurity was passed to strip liquor storage for metals recovery.

It is impossible to completely chemically precipitate the uranium values from the strip liquor in the presence of the humates and the most convenient method of recovering separate uranium and molybdenum products was to evaporate the strip liquor to dryness, and then calcine the residue in air at a temperature of about 600–700° C. for about 1½ hours. This decomposed the humates and oxidized them to carbon dioxide. The calcine was leached with water containing a small amount of sodium hydroxide to remove the water soluble constituents and the resulting residue was a substantially pure yellow cake which met all specifications and no further purification was required. Since the molybdenum value content of the calcine was completely soluble in the water, molybdenum values were separated from the uranium product and may be recovered from the leach solutions by precipitation as ammonium phosphomolybdate.

Observations and data are recorded below for a variety of the raw lignite leach liquor conditioning processes. As received, the filtered raw lignite percolation leach liquor had a pH of 0.8–1.1 and it was heavily contaminated with solubilized humates and silica which prevented normal solvent extraction due to sludge and emulsion problems. Except where stated otherwise, 90 liter portions of the raw leach liquor were charged to a coated steel drum fitted with a "Lightnin" mixer and porous stone aerator and treated as indicated.

Where indicated, freshly prepared glue solution containing 67 grams of hide glue and 2–4 liters of water was added over a 2 hour period with stirring and vigorous aeration. Excessive foaming was controlled by periodic addition of 10 milliliter portions of 2% sodium tallate solution, a total of 30 milliliters being required during the conditioning period. This portion of the conditioning treatment was practiced for all liquors treated with glue. The glue-humate sludge which formed and floated in the foam was collected, suspended in a liter of water, and boiled to break up the mass and release any occluded unreacted glue. The resulting mixture was then poured back into the charge and aeration was continued for an additional 15 minutes. Some portions of liquor were then treated with 8 grams of Ethomeen T/25 diluted with 250 milliliters of water and aerated an additional 15 minutes. The treated liquor was filtered to separate the sludge which had formed.

In the two initial runs, to each 50 liters of raw filtered liquor after treatment with glue was added 13 grams of Triton X–100 dissolved in 200 milliliters of water, the mixture well mixed, and the treated liquor was used directly in the solvent extraction. Two 90 liter charges of leach liquor were conditioned in this manner and solvent extracted and it was evident that the Triton X–100 was forming a gummy resinous precipitate that was plugging up the feed liquor lines. There was no evidence of any serious accumulation of sludge in the settlers and the overall solvent extraction was greatly improved over raw untreated liquor.

In the third and fourth runs, the leach liquor was conditioned with glue and Ethomeen T/25. No Triton X–100 was added. The treated leach liquor was satisfactory for solvent extraction.

In run 5, the leach liquor was conditioned only with Triton X–100 at the rate of 100 grams for each 90 liters of leach liquor. The liquor was aerated and stirred for 4 hours, and then filtered to remove a gummy semi-liquid which formed. The treated liquor behaved satisfactorily in solvent extraction.

In run 6, filtered but otherwise untreated raw leach liquor was employed. It was necessary to terminate the solvent extraction due to severe emulsion formation after only 4 hours of operation. It was impossible to solvent extract the raw untreated liquor over an extended period of time.

The leach liquor in run 7 was conditioned with 60 grams of Triton X–100 and no other reagents were employed. There was some interfacial sludge formation and it was necessary to terminate the solvent extraction after two days of operation. Nevertheless, a great improvement was obtained over the raw untreated liquor of run 6.

In runs 8, 9 and 10, raw leach liquor was conditioned with 75 grams of glue with vigorous aeration, followed by addition of 45 grams of Triton X–100, agitation and filtration. Before the Triton X–100 was added, the glue-humate complex was collected and boiled as in runs 1 and 2. The liquor behaved entirely satisfactorily in solvent extraction.

In run 11, the raw leach liquor was conditioned with 75 grams of glue dissolved in 9 liters of water in order to allow the glue time to react more completely with precipitable material. The resulting glue-humate complex was not collected for boiling as before. Triton X–100 (45 grams) was added as before, the mixture agitated for 45 minutes and filtered. The filtrate still exhibited minor emulsion formation in laboratory tests which was believed to be attributable to solubilized silica. The uranium and molybdenum loaded leach liquor was very rich in uranium (3 grams per liter $U_3O_8$) and was also much richer in contaminating humates and silica so that it was undertreated in this conditioning process. However, the liquor behaved generally satisfactorily in solvent extraction.

It was also possible to condition the leach liquor with water dispersible crosslinked poly (N-vinyl pyrrolidone) which produces a humate-silica complex as a precipitate. Water dispersible crosslinked glue also may be used, as may very low molecular weight polyethylene oxides having molecular weights of 4, 10 and 20 thousand. When using the low molecular weight polyethylene oxides better results are obtained upon contacting the treated liquor with fresh silica gel as there is a much more rapid precipitation of the contaminants.

What is claimed is:

1. A process for treating an acidic aqueous medium containing an impurity consisting essentially of solubilized humates dissolved therein comprising precipitating the humates by dispersing in the acidic aqueous medium at least one substance selected from the group consisting of water soluble organic compounds having a molecular weight of at least 4,000 and containing a plurality of oxyalkylene groups of the formula (—O—R—)$_n$, wherein R is an alkylene radical containing 2 through 8 carbon atoms and $n$ is an integer having a value of at least 2 water dispersible collagen derived colloidal proteinaceous substances selected from the group consisting of glue and gelatin, water dispersible poly (N-vinyl pyrrolidone) having a molecular weight of at least 4,000, and mixtures thereof.

2. The process of claim 1 wherein the substance dispersed in the aqueous medium is a precipitant for the solubilized humates comprising a water soluble organic compound having a molecular weight of at least 4,000 and containing a plurality of oxyalkylene groups of the formula (—O—R—)$_n$, wherein R is an alkylene radical containing 2 through 8 carbon atoms and $n$ is an integer having a value of at least 2.

3. The process of claim 1 wherein the substance dispersed in the aqueous medium is a precipitant for the solubilized humates comprising a water dispersible collagen derived colloidal proteinaceous substance selected from the group consisting of glue and gelatin.

4. The process of claim 1 wherein the substance dispersed in the aqueous medium is a precipitant for the solubilized humates comprising a water dispersible poly (N-vinyl pyrrolidone) having a molecular weight of at least 4,000.

5. The process of claim 1 wherein the pH value of the aqueous medium is below 4.5.

6. The process of claim 1 wherein the aqueous medium contains humates selected from the group consisting of solubilized sulfated humates and sulfonated humates.

7. The process of claim 1 wherein the said water soluble compound containing a plurality of oxyalkylene groups is dispersed in the aqueous medium and the aqueous medium is contacted with silica gel.

8. The process of claim 1 wherein a water dispersible collagen derived colloidal proteinaceous substance selected from the group consisting of glue and gelatin is first dispersed in the aqueous medium and thereafter the said water soluble organic compound containing a plurality of oxyalkylene groups is dispersed in the aqueous medium.

9. The process of claim 1 wherein the aqueous medium has a pH value below 4.5 and contains humates selected from the group consisting of solubilized sulfated humates and sulfonated humates.

10. The process of claim 1 wherein the acidic aqueous medium is an aqueous leach liquor containing solubilized humates capable of emulsion stabilization, the leach liquor being prepared by leaching lignite ore with aqueous sulfuric acid.

11. The process of claim 10 wherein the substance dispersed in the aqueous medium is poly(ethylene oxide).

12. The process of claim 11 wherein about 0.1–10 pounds of the poly(ethylene oxide) is dispersed in each short ton of the leach liquor and the leach liquor is aerated with an elemental oxygen-containing gas selected from the group consisting of air and oxygen.

13. The process of claim 10 wherein about 0.1–10 pounds of glue is dispersed in each short ton of the leach liquor, the leach liquor is aerated with an elemental oxygen-containing gas selected from the group consisting of air and oxygen, the resulting humate precipitate is filtered from the leach liquor, and thereafter about 0.1–10 pounds of at least one organic compound in accordance with claim 2 is dispersed in each short ton of the leach liquor.

14. The process of claim 10 wherein the organic compound dispersed in the leach liquor is polyethoxylated phenol and the pH of the leach liquor is about 1–2 s.

15. In a hydrometallurgical process for the recovery of dissolved metal values from an acidic aqueous medium containing initially an impurity consisting essentially of solubilized humates dissolved therein wherein the solubilized humates normally interfere with the recovery of the metal values, the improvement comprising precipitating the humates by dispersing in the acidic aqueous medium at least one substance selected from the group consisting of water soluble organic compounds having a molecular weight of at least 4,000 and containing a plurality of oxyalkylene groups of the formula (—O—R—)$_n$, wherein R is an alkylene radical containing 2 through 8 carbon atoms and $n$ is an integer having a value of at least 2, water dispersible collagen derived colloidal proteinaceous substances selected from the group consisting of glue and gelatin, water dispersible poly (N-vinyl pyrrolidone) having a molecular weight of at least 4,000, and mixtures thereof, and thereafter recovering the dissolved metal values from the aqueous solution.

16. In a process for the recovery of dissolved metal values by liquid-liquid solvent extraction with a water immiscible liquid organic solvent extractant from an acidic aqueous medium containing initially an impurity consisting essentially of solubilized humates dissolved therein, the organic solvent extractant and aqueous medium being intermixed and the solubilized humates normally retarding separation of the organic solvent extractant and aqueous phases, the improvement comprising precipitating the humates by dispersing in the acidic aqueous medium at least one substance selected from the group consisting of water soluble organic compounds having a molecular weight of at least 4,000 and containing a plurality of oxyalkylene groups, of the formula (—O—R—)$_n$, wherein R is an alkylene radical containing 2 through 8 carbon atoms and $n$ is an integer having a value of at least 2, water dispersible collagen derived colloidal proteinaceous substances selected from the group consisting of glue and gelatin, water dispersible poly (N-vinyl pyrrolidone) having a molecular weight of at least 4,000, and mixtures thereof, and thereafter recovering the metal values from the aqueous medium by liquid-liquid solvent extraction with the water immiscible liquid organic solvent extractant.

17. The process of claim 16 wherein the aqueous medium in which the precipitant is dispersed has a pH value below 4.5 and contains humates selected from the group consisting of solubilized sulfated humates and sulfonated humates.

18. The process of claim 16 wherein the aqueous medium is a leach liquor prepared by leaching lignite ore with aqueous sulfuric acid.

19. The process of claim 18 wherein glue is first dispersed in the leach liquor and thereafter at least one water soluble organic compound in accordance with claim 2 is dispersed in the leach liquor.

20. The process of claim 18 wherein about 0.1–10 pounds of the substance is dispersed in each short ton of the leach liquor and the leach liquor is aerated with an elemental oxygen-containing gas selected from the group consisting of air and elemental oxygen.

References Cited by the Examiner

UNITED STATES PATENTS

| | | | |
|---|---|---|---|
| 3,020,229 | 2/1962 | Thompson | 210—54 |
| 3,020,230 | 2/1962 | Smith | 210—54 |
| 3,020,231 | 2/1962 | Colwell. | |
| 3,023,162 | 2/1962 | Fordyce | 210—54 |
| 3,146,193 | 8/1964 | Sullivan | 210—54 |
| 3,147,218 | 8/1964 | Booth | 210—54 |
| 3,154,376 | 10/1964 | Paige. | |

OTHER REFERENCES

Clegg et al, Uranium Ore Processing, Atoms for Peace, Geneva 1958, pp. 172–182, Addison-Wesley Publishing Co., Inc.

CARL D. QUARFORTH, *Primary Examiner.*

BENJAMIN R. PADGETT, *Examiner.*

S. TRAUB, *Assistant Examiner.*